Dec. 1, 1931. E. C. GLEDHILL 1,834,240
LEANING WHEEL
Filed Nov. 5, 1930  2 Sheets—Sheet 1
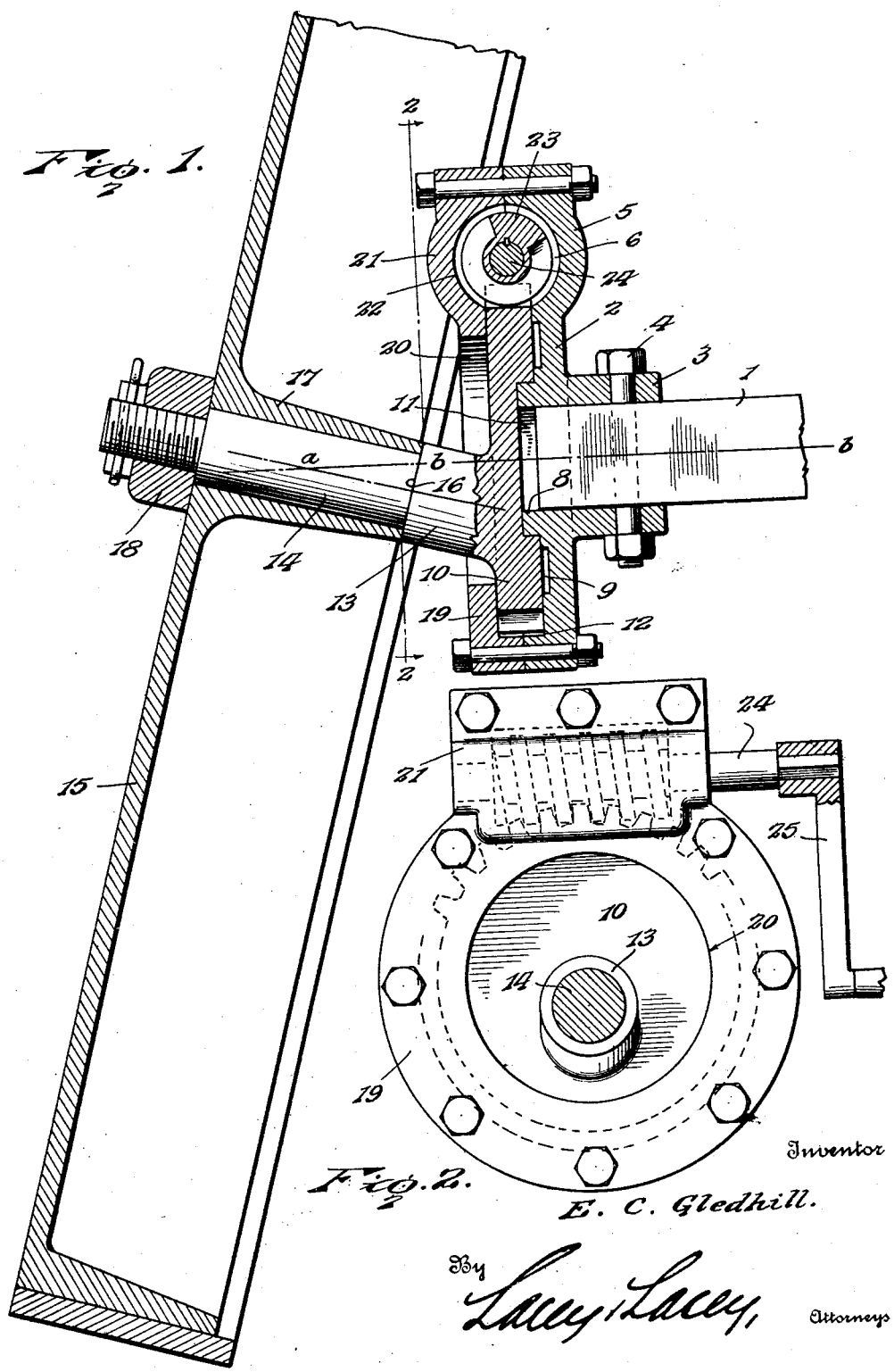
Inventor
E. C. Gledhill.
By Lacey & Lacey,
Attorneys

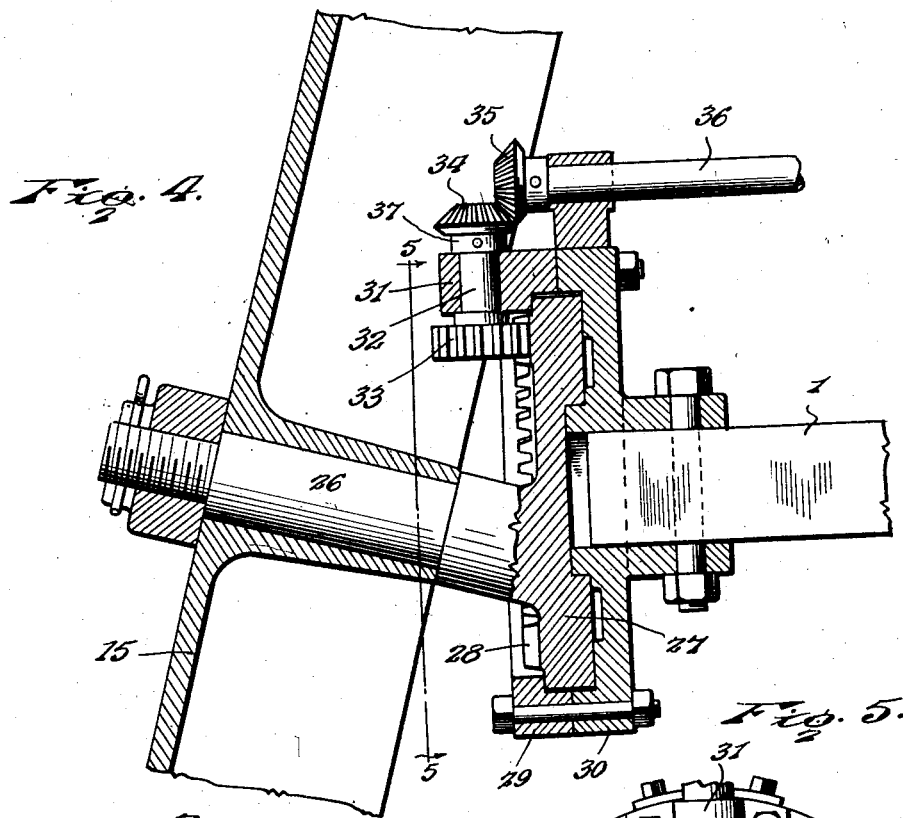
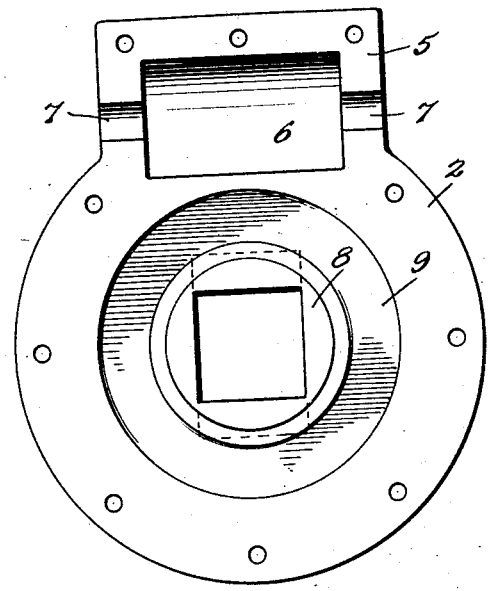
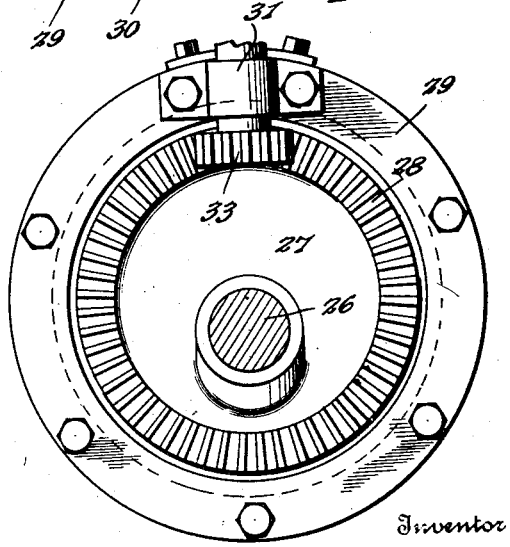

Patented Dec. 1, 1931

1,834,240

UNITED STATES PATENT OFFICE

EDWARD C. GLEDHILL, OF GALION, OHIO

LEANING WHEEL

Application filed November 5, 1930. Serial No. 493,641.

This invention relates to tilting wheels employed upon road graders and similar machines and its object is to provide simple and compact means whereby the wheel may be easily set in any desired degree of inclination relative to both horizontal and vertical planes. The invention is illustrated in the accompanying drawings and will be hereinafter fully set forth.

In the drawings:

Figure 1 is a vertical section of one form of mechanism embodying the invention, Fig. 2 is a sectional elevation, the section being taken on the line 2—2 of Fig. 1, Fig. 3 is a detail face view of a portion of the casing shown in Fig. 1, Fig. 4 is a view similar to Fig. 1 but showing a different embodiment of the invention, and Fig. 5 is a section on the line 5—5 of Fig. 4.

In the drawings, the reference numeral 1 indicates the end of a stationary axle. To the end of this axle, I secure a casing member 2 having a boss 3 upon its inner side through which the securing bolt 4 is passed, it being noted that the axle and the bore of the boss 3 are preferably rectangular so that rotation of the gear case member about the axle is positively prevented. The gear case member 2 consists of a substantially circular plate disposed concentric with the hub 3 and having a tangential extension 5 at its top which extension is formed with a semi-cylindrical recess or channel 6 in its outer face and grooves 7 extending from the ends of said channel through the ends of the plate, as shown clearly in Fig. 3. The plate is also provided on its outer face at its center with an annular rib or projection 8 and concentric with but radially beyond said rib or projection has an annular groove 9 in its outer face. In the form of the invention shown in Figs. 1, 2 and 3, a worm gear 10 provided with a central recess 11 is fitted over the projection 8 and is of such diameter that it will extend up to the channel or chamber 6, as clearly shown in Fig. 1, and it may be noted that the lower portion of the plate 2 may be recessed, as shown at 12, to accommodate the periphery of the worm gear. Formed integral with the worm gear 10 and extending outwardly therefrom is a spindle 13, the inner end of which is eccentrically located upon the worm gear and the outer end of which is disposed at the opposite side of the line $b$—$b$ corresponding to the central line of the axle 1 so that, while the spindle is inclined or in angular relation to the gear wheel, the central point $a$ of the spindle will be on the center line of the axle and a shifting of the spindle will vary the inclination of the same relative to vertical and horizontal planes but will not raise or lower the machine to which the wheel is applied. The central point $a$ of the spindle is within a reduced portion 14 upon which the wheel 15 is rotatably mounted, the formation of the spindle producing an annular shoulder 16 against which the inner side of the wheel hub 17 rests. The wheel is held upon the spindle by a nut 18 fitted upon the extreme outer end of the spindle and turned home against the outer side of the wheel and a hub cap or other cover may, if desired, be provided to protect the end of the spindle and the nut against an accumulation of dirt.

The worm gear 10 is held to the gear case member 2 by an outer casing member or cap plate 19 which is similar in contour to the casing member 2 and has an enlarged central opening 20 through which the spindle may pass and which will amply accommodate the various positions assumed by the spindle in the adjustment of the wheel. The outer casing member or cap plate 19 has an upper extension 21 which is formed with a semi-cylindrical chamber 22 in its inner face to mate with the chamber 6 and accommodate the worm 23 disposed within said chambers and secured upon the end of a shaft 24 which is shown in Fig. 2 as having one end constructed to be engaged by a crank handle 25 in order that the shaft may be rotated when desired. It is to be understood, however, that the shaft 24 may be extended to a point near the driver's seat on the machine and any convenient or preferred means for rotating the shaft may be provided.

In Fig. 1, the wheel is shown in such position that its top is tilted toward the side of the machine. If the worm shaft 24 be rotated, the worm gear 10 will, of course, be set in motion and will rotate about the central line of the axle within the gear case defined by the members 2 and 19. If the rotation of the gear wheel be continued through one-half a revolution, the spindle 14 will be shifted to a position directly opposite the position illustrated and the wheel will then be tilted so that its top will extend away from the machine. If the gear wheel be given a quarter turn, the top and bottom of the wheel will be brought into the same vertical plane but the wheel will be inclined so that its front and rear will be out of parallelism with the machine and, of course, any intermediate position may be given the wheel. The mechanism is very simple and compact and it will serve as its own lock to prevent premature or accidental shifting of the wheel out of the position in which it may have been set.

In the form of the invention illustrated in Figs. 4 and 5, the wheel 15 is mounted upon the spindle 26 in the same manner that the wheel is mounted in the first described form and the spindle 26 corresponds in its form and location to the spindle 13—14. In the present arrangement, however, the spindle is carried by a plate 27 having gear teeth 28 on its outer face so that instead of the worm gear shown in the previously described embodiment, there is now employed a ring gear or crown gear. The gear element 27 is fitted to and between plates 29 and 30 constituting a gear case and the plate 30 is secured to the axle 1 in the same manner that the gear casing member 2 of the first described form is secured. The outer plate 29 is provided on its outer face at its top with a projection 31 having a vertical opening therethrough in which is journaled a short shaft 32 carrying a pinion 33 on its lower end which meshes with the gear teeth 28 so as to rotate the gear element 27. Upon the upper end of the shaft 32 is secured a beveled pinion 34 which meshes with a similar pinion 35 on the end of an operating shaft 36 which may be mounted in any convenient manner upon the machine and equipped with any preferred operating or rotating mechanism. The pinion 34 is provided with a hub 37 which rests upon the upper side of the bearing lug 31 and thereby prevents dropping of the shaft 32 and its pinions. The operation of this form of the invention is the same in all essential respects as the first described form and it possesses the same advantages of simplicity and compactness which are present in the first described arrangement.

Having thus described the invention, I claim:

1. In a tilting wheel mechanism, a gear element, means for rotatably mounting said element upon the end of an axle, means for rotating the element, a spindle extending from the outer side of the gear element and having its inner end located eccentrically upon said element, the spindle being disposed at an angle to the gear element whereby it will pass across a line extending from the center of the gear element at a right angle thereto, and a wheel rotatably mounted upon said spindle.

2. In a tilting wheel mechanism, a rotatable gear element, means for mounting said element upon the end of a stationary axle, means for rotating the element, and a spindle carried eccentrically by said gear element in inclined relation thereto whereby the center of the spindle will be alined with the center line of the axle, and a wheel rotatably fitted upon the spindle.

3. In a tilting wheel mechanism, a gear case comprising an inner member, means for securing said member upon the end of an axle, said member being provided upon its outer face with a central projection, a gear element having a central recess in its inner side rotatably engaging said projection on the gear casing member, an outer member secured to said inner member and projecting over the gear element whereby to retain said element in place, means for rotating the element, and a spindle carried eccentrically by the outer side of the gear element and disposed at an inclination thereto.

4. In a tilting wheel mechanism, a gear casing, means for securing said gear casing upon the end of an axle, a gear element mounted within said casing and rotatable about the end of the axle, means carried by the casing for rotating said gear element, and a spindle extending from the outer side of the gear element at an incline relative thereto, the inner end of the spindle being located eccentrically upon the gear element.

5. In a tilting wheel mechanism, a gear casing, means for securing said casing upon the end of an axle, a worm gear housed within said casing and rotatable about the end of the axle, a worm housed in the upper portion of the casing and meshing with said worm gear, and a spindle carried eccentrically by the outer side of the worm gear and extending therefrom at an inclination thereto.

6. In a tilting wheel mechanism, a gear casing, means for securing the casing upon the end of an axle, a ring gear housed within the gear casing and rotatable about the end of the axle, a short shaft mounted in the upper side of the gear casing, a pinion on the lower end of said shaft meshing with the ring gear, means for rotating said shaft, and a spindle located eccentrically upon the outer side of the ring gear and projecting outwardly therefrom at an inclination thereto.

In testimony whereof I affix my signature.

EDWARD C. GLEDHILL. [L. S.]